United States Patent [19]

Smith

[11] 4,047,729

[45] Sept. 13, 1977

[54] DIRIGIBLE VEHICLE

[76] Inventor: Harry Tabb Smith, Box 437, Yorktown Road, Tabb, Va. 23602

[21] Appl. No.: 578,349

[22] Filed: May 16, 1975

[51] Int. Cl.² .......................... B62K 5/02; B62K 5/08
[52] U.S. Cl. .................................. 280/267; 272/114; 280/1.11 R
[58] Field of Search .............. 280/259, 263, 267, 268, 280/269, 282, 87.01, 87.04 R, 87.02 R, 1.11, 91, 47.11; 180/21, 25 R; 272/1 R, 57 T, 33 A

[56] References Cited

U.S. PATENT DOCUMENTS

| 1,599,223 | 9/1926 | Epps | 280/269 |
|---|---|---|---|
| 2,330,557 | 9/1943 | Collis | 280/47.11 X |
| 3,040,510 | 6/1962 | Van Der Lely | 180/25 R X |
| 3,085,644 | 4/1963 | Van Der Lely | 180/25 RX |
| 3,398,971 | 8/1968 | Seidel | 280/47.11 |
| 3,438,649 | 4/1969 | Schermerhorn et al. | 280/259 |
| 3,507,511 | 4/1970 | Seidel | 280/47.11 |
| 3,567,242 | 3/1971 | Miller | 280/87.04 R |
| 3,601,422 | 8/1971 | Woods | 280/91 |
| 3,717,360 | 2/1973 | Kennedy | 280/259 |
| 3,829,127 | 2/1973 | McLellan | 280/259 |
| 3,836,177 | 8/1973 | Heidt | 280/269 |

FOREIGN PATENT DOCUMENTS 786,221 11/1957 United Kingdom .............. 280/47.11

Primary Examiner—Joseph F. Peters, Jr.
Assistant Examiner—J. D. Rubenstein
Attorney, Agent, or Firm—Wender, Murase & White

[57] ABSTRACT

A dirigible vehicle which is supported upon at least three ground engaging wheels located about the lower periphery of the device. Two of the three wheels are steerable while the third is fixed in position with its axis perpendicular to a line interconnecting the two steerable wheels. By manipulation of the steerable wheels, the vehicle may be adapted for movement along a linear path or may be made to spin about its own axis. Intermediate positioning of the steerable wheels will cause the vehicle to sweep in large circular arcs. The device may be self-propelled by a foot pedal assembly or by a small motor, with either a single steering wheel or dual independent steering controls. The unique steering capabilities of the vehicle make it ideally suited for recreational purposes or wherever extreme maneuverability is required.

8 Claims, 9 Drawing Figures

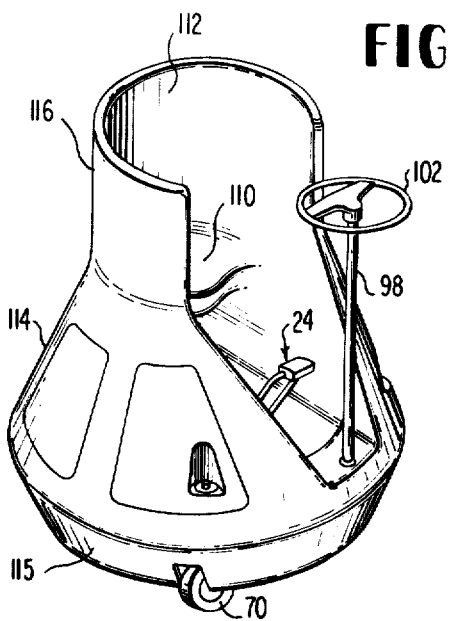
FIG.1
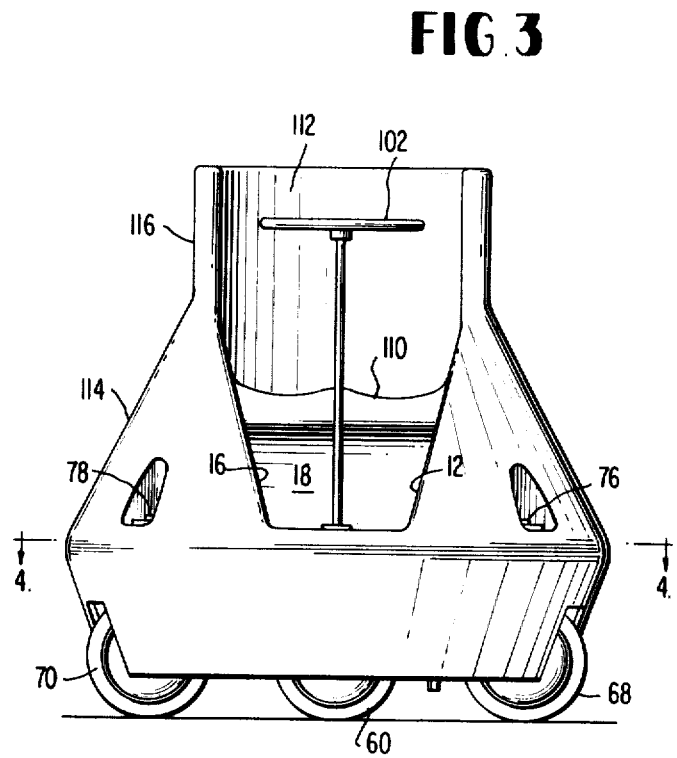
FIG.3
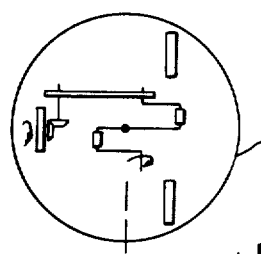
FIG.2
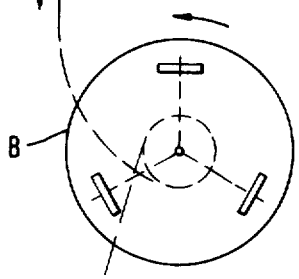
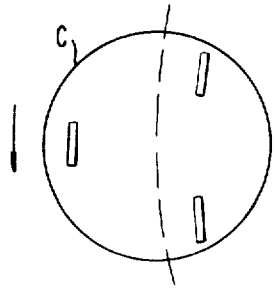
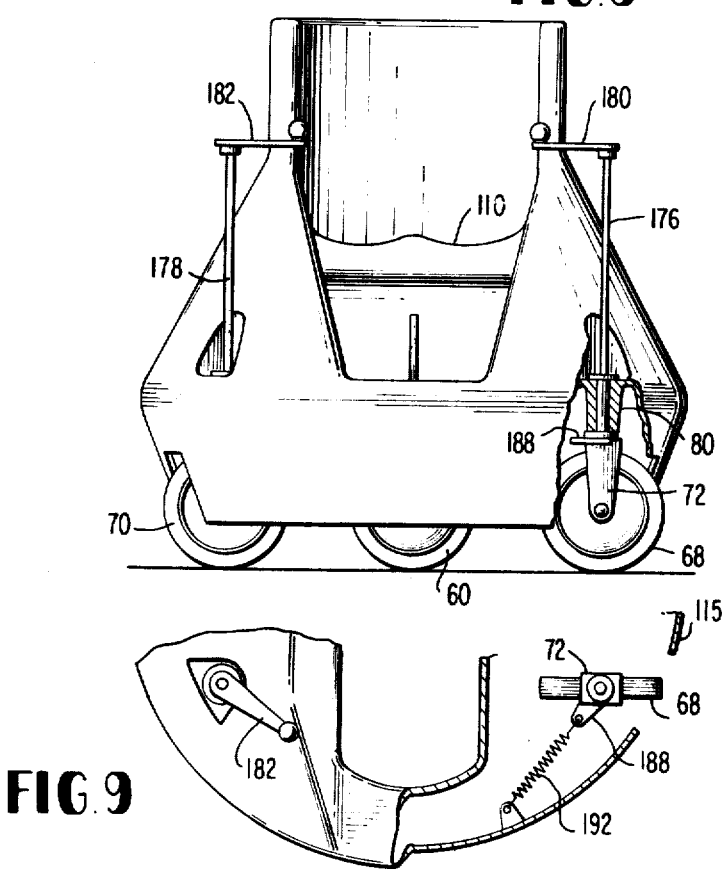
FIG.8
FIG.9

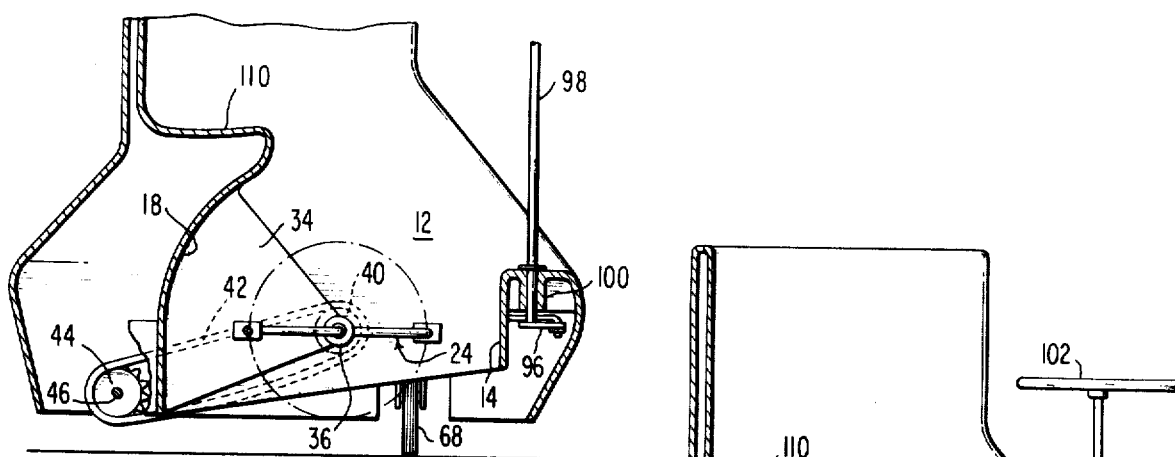
FIG.5
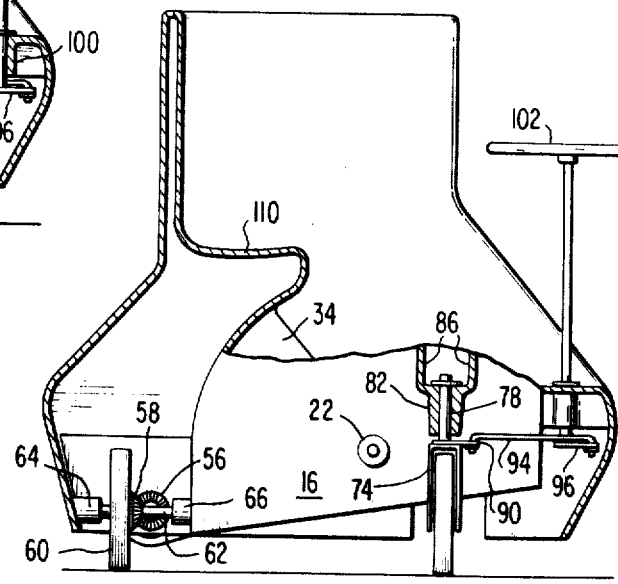
FIG.6
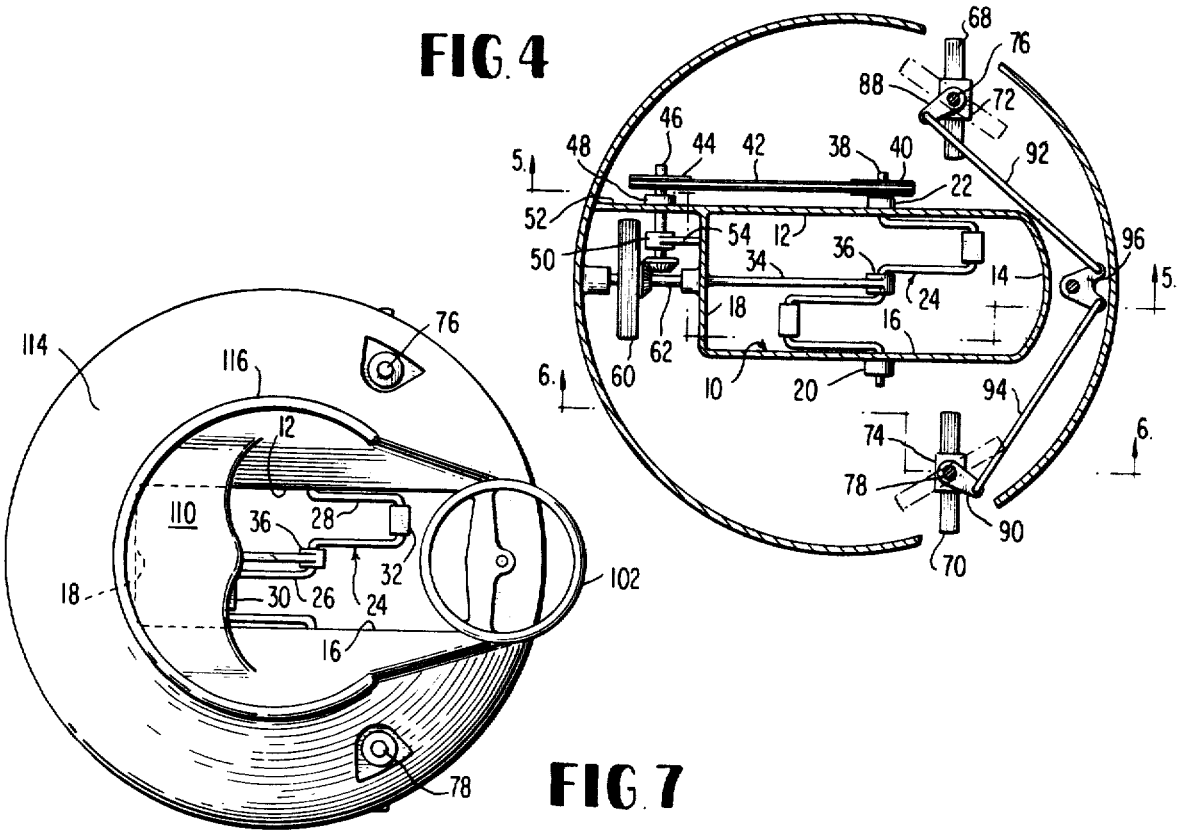
FIG.4
FIG.7

DIRIGIBLE VEHICLE

BACKGROUND OF THE INVENTION

1. Field of the Invention:

The present invention relates to dirigible vehicles, and particularly, to a self-propelled vehicle having a steering assembly such that the vehicle can spin about its own axis, can traverse linear paths, or can move along curved paths of varying radius.

2. Description of the Prior Art:

Various vehicles, particularly recreational vehicles, capable of providing unique or unusual motion have been available for some time. U.S. Pat. No. 2,501,035; 3,306,627; 3,438,649; 3,717,360 and 3,829,127 are generally illustrative of such prior art devices. These, as well as other vehicles, can be used both for recreation and for exercise in that they are self-propelled and provide considerable entertainment.

While the prior art devices have been generally satisfactory, they have received less than full commercial acceptance because of the complexity and expense required to construct them, or because of the numerous disadvantages which they often exhibit. For example, many prior art systems are unstable and thus pose a serious safety hazard for children. Many of them also exhibit extremely limited flexibility in movement or maneuverability. As a result, children often lose interest after a short period of time.

Many of the shortcomings typical in the prior art stem from the fact that the steering assemblies are modifications or variations of conventional steering assemblies used in vehicles designed not for recreation or entertainment, but for transportation, i.e., for getting from one place to another. Transportation vehicles, however, must meet very different design criteria not suitable for recreation vehicles. The purposes and desired operational characteristics of transportation vehicles are thus basically different from the steering systems which might be available for recreational vehicles.

By starting with the basic design construction of a conventional transportation vehicle, many recreational and entertainment vehicles have been unnecessarily limited in flexibility and maneuverability. Similar limitations are therefore imposed on the amount of enjoyment which can be derived from such prior art assemblies.

SUMMARY OF THE INVENTION

The present invention provides a unique steering assembly which is totally and completely unrelated to any conventional steering assembly heretofore available. Because of this unique design, the present invention is capable of many noval and unusual maneuvers which are unexpected and thus provide an extra degree of entertainment, especially when used by children. The invention also exhibits extremely high safety characteristics in that the riders are protected by the outer body or shell of the device, and the vehicle is extremely stable.

The unique steering assembly of the present invention also makes it especially well suited for use as an industrial vehicle, as a golf cart, and for many other purposes. Since the vehicle can move along a straight line and at any time stop and spin about its own axis, it provides a greater degree of flexibility than provided by other vehicles using conventional steering assemblies.

It is therefore an object of the present invention to construct a vehicle movable along linear paths, curved paths, and about its own axis.

Another object of the present invention is to construct a self-propelled recreational vehicle having three equally spaced wheels for providing unique steering manipulation ability and high stability and safety.

A further object of this invention is to construct a toy vehicle having an integral frame, body, and seat constructed of a unitary molded or stamped piece of material.

The present invention exhibits many advantages over the prior art in that it is simple and economical to manufacture, exhibits high safety characteristics, provides unusual movement and steering manipulation and effectively achieves the combined advantages of providing exercise as well as recreation.

The invention is summarized as a vehicle including a frame, a wheel assembly on the frame having a first position for supporting the vehicle for movement along a linear path and a second position for supporting the vehicle for spinning movement, and a steering assembly on the frame coupled to the wheel assembly for moving the same between its first and second positions.

Other objects and advantages of the present invention will become apparent from the following description of the preferred embodiments when taken in conjunction with the accompanying drawings.

BRIEF DESCRIPTION OF THE DRAWINGS

FIG. 1 is a perspective view of a preferred embodiment of a vehicle according to the present invention;

FIG. 2 is a diagrammatic view illustrating the essential components of the wheel support assembly of the vehicle of FIG. 1 and showing representative paths of movement;

FIG. 3 is a front elevational view of the vehicle of FIG. 1;

FIG. 4 is a sectional view taken along line 4—4 of FIG. 3;

FIG. 5 is a sectional view taken along line 5—5 of FIG. 4;

FIG. 6 is a sectional view taken along line 6—6 of FIG. 4;

FIG. 7 is a top plan view of the vehicle of FIG. 1;

FIG. 8 is a front elevational view of a modification of the embodiment of FIG. 1, with parts broken away; and FIG. 9 is a partial top plan view of the vehicle of FIG. 8 with parts broken away.

DESCRIPTION OF THE PREFERRED EMBODIMENTS

A first embodiment of a vehicle according to the present invention is illustrated in FIGS. 1 through 7 and has the overall shape and appearance of a space capsule. The vehicle has a main frame 10 with a generally rectangular central opening defined by generally vertical walls 12, 14, 16 and 18. A pair of bearings 20 and 22 in side walls 12 and 16, respectively, support a foot pedal assembly 24 for free rotation within the central opening. The foot pedal assembly 24 is constructed of a solid rod having first and second generally U-shaped offset portions 26 and 28 extending in opposite directions and supporting pedals 30 and 32, respectively. A vertical wall 34 extending from the middle of wall 18 supports a third bearing 36 for the central portion of the foot pedal assembly 24.

One end 38 of the foot pedal assembly 24 extends beyond bearing 20 on the opposite side of the wall 12 from the central opening. Mounted on end 38 is a first sprocket wheel 40 for cooperation with an endless chain 42 which is similarly constrained around a second sprocket wheel 44. Sprocket 44 is fixedly mounted on a shaft 46 supported by bearings 48 and 50. Bearing 48 is carried by a wall 52 while bearing 50 is mounted on the end of another short wall 54 extending rearwardly from wall 18. On the opposite end of shaft 46 from sprocket wheel 44 there is mounted a first bevel gear 56 disposed for cooperative engagement with a second bevel gear 58 attached to a ground engaging wheel 60. Wheel 60 has an axle 62 mounted for free rotation between a pair of bearings 64 and 66.

Two additional wheels 68 and 70, which are generally identical in configuration the wheel 60, are mounted for free rotation in a pair of inverted, generally U-shaped brackets 72 and 74 respectively. Affixed to and protruding upwardly from each of brackets 72 and 74, is an axle 76, 78 which is rotatably disposed in a bearing 80, 82 carried on interior wall sections 84, 86 of the frame 10.

A pair of elongated arms 88 and 90 are fixedly secured atop brackets 72 and 74 at an angle of approximately 45° from the axis of wheels 68 and 70. Arm 88 points inwardly of the vehicle while arm 90 points outwardly thereof as visualized in FIG. 4. A pair of connecting rods 92 and 94 are coupled between the end of arms 88 and 90, respectively, and the ends of the two arms of a bell crank 96. Bell crank 96 is attached to the bottom end of a steering shaft 98 which is rotatably secured within a bearing 100 carried by the vehicle frame 10. Mounted atop the steering column 98 is a suitable steering wheel 102.

A seat 110 is mounted atop the frame 10 to the rear of and slightly above the opening defined by walls 12, 14, 16 and 18. Wall 18 curves inwardly and upwardly, as shown in FIG. 6, to join the seat 110 while walls 12 and 16 diverge outwardly and join each other at their upper, rear ends to form a curved backrest 112. The vehicle body has a frusto-conical lower portion 114 which is contiguously joined to a generally cylindrical upper portion 116 to define the overall "space capsule" shape. A bottom skirt 115, also preferably frustro-conical, extends downwardly from the bottom of portion 114 to conceal the gear, chain, steering and support assemblies of the frame. Wheels 60, 68 and 70 are also preferably at least partially concealed.

The vehicle according to the present invention may be constructed in any suitable manner, but it is preferred that the frame, seat, back rest, and body be formed as an integral, unitary structure as depicted in the drawings. The vehicle is thus particularly well adapted for manufacture by molded plastic techniques, by metal stamping, or by layering or spraying fiberglass on a prepared mold. Aside from convenience and economy of initial manufacture, by constructing the vehicle as a unitary assembly, superior safety features are provided in the elimination of sharp edges and corners as well as seams which might pinch or bind clothing.

As can be appreciated from FIG. 4, the vehicle is supported upon three wheels whose centers are equally spaced at the corners of an equilateral triangle. This provides for extreme stability especially since seat 110 is located within the space bounded by verticle planes joining the three wheels.

Wheel 60 acts as the driving wheel of the system and is rotated by operation of the foot pedal assembly 24 by the rider. Wheel 60 has its axis fixed relative to the vehicle frame and cannot be steered or turned. On the other hand, both of the other two wheels, 68 and 70, may be steered by rotation about their axes 76 and 78 respectively. By virtue of the orientation of arms 88 and 90, rotation of shaft 98 by turning the steering wheel 102 will cause the wheels to move from a position parallel to wheel 60, as shown in solid lines in FIG. 4, to a position where the axes of all three wheels intersect at the midpoint or vertical axis of the vehicle, as shown in dashed lines in FIG. 4. Thus, as the steering wheel 102 is turned, each of two dirigible wheels 68 and 70 will be steered in opposite directions; i.e., while wheel 68 is steered counterclockwise, wheel 70 will be steered clockwise, and vise-versa.

Referring to FIG. 2, it can be appreciated that the vehicle traverses a rather unique and unusual path of motion during operation. Starting at position A, the steering wheel 102 is manipulated such that wheels 68 and 70 are aligned in parallel with wheel 60. By manipulating the foot pedal assembly 24, the rider will then cause the vehicle to move along a straight path as shown. It is noted at this point that since the driving wheel 60 is disposed under the seat 110 the rider will be moved sideways as the vehicle traverses its straight path. It should be appreciated that the seat and body may be oriented such that the rider will be moved straight ahead or backward during this mode of operation; however, by constructing the vehicle as illustrated the rider experiences a very unusual effect since one would normally expect to move forward or backwards when operating the foot pedals, rather than sideways.

As the vehicle moves along the straight path, if the steering wheel is turned from its initial position to its second extreme position, which causes the wheels 68 and 70 to move from positions where their axes are parallel to the axis of wheel 60 to positions where their axes intersect that of wheel 60 at the midpoint of the vehicle, the vehicle will be caused to spin about its own axis as shown at position B. As the rider operates the foot pedals 24, the vehicle will continue to spin in either direction while remaining stationary. If the steering wheel 102 is then turned back toward its initial position, the wheels 68 and 70 will be moved toward their initial parallel positions with respect to the driving wheel 60 so as to cause the vehicle to move along a curved path of rather large radius. The path of travel and position of the three wheels is depicted at position C in FIG. 2. It can be appreciated that depending upon the amount the steering wheel 102 is turned, the radius of the curved path of motion will vary between the one extreme, where the vehicle moves along a straight line, and the other extreme, where the vehicle spins about its own axis at a stationery point.

A modification of the vehicle according to the present invention is illustrated in FIGS. 8 and 9. In this embodiment, independent steering of each of the two wheels 68 and 70 is provided by replacing axles 76 and 78 with shafts 176 and 178 which have appropriate steering arms 180 and 182 attached to their upper ends. This, of course, eliminates the need for the connecting arms 92 and 94 as well as the steering shaft 98 and steering wheel 102. Also, arms 88 and 90 are replaced by arms 188 and 190 which are connected by tension springs 192 and 194, respectively, to the vehicle frame. Springs 192 and 194 bias the wheels 68 and 70 to positions in parallel with the driving wheel 60; although, it should be realized that the wheels may be similarly biased to the position where the vehicle will normally spin about its own axis.

The operation of the embodiment of FIGS. 8 and 9 is generally similar to that of the first embodiment with the exception that each steerable wheel may be controlled independently. This allows greater randomness in steering control of the vehicle when used, for example, as a recreational toy.

From the foregoing, it can be seen that the present invention has numerous advantages in the unique nature of the steering assembly and steering control. The vehicle can move along a straight path, can stop, can spin about its own axis, can continue along another straight path, can sweep along curved arcs of varying radius, and can once again traverse a linear path with great ease.

Aside from the fun and entertainment value of such a unique and unusual movement, many situations arise which require the added flexibility and maneuverability of the present device. For example, industrial trucks and forklift vehicles used in factories and warehouses often have to move down long aisles between shelves or racks and subsequently return. The present vehicle can easily move down the aisle, stop to load or unload, turn 180° about its own axis, and return.

Inasmuch as the present invention is subject to many variations, modifications and changes in detail, it is intended that all matter contained in the foregoing description or shown in the accompanying drawings shall be interpreted as illustrative and not in a limiting sense.

What is claimed is:

1. A vehicle comprising a frame; at least three ground engaging wheels on said frame, vertical axes through the center of each of said wheels being substantially equally spaced from each other whereby said wheels form the corners of an equilateral triangle; one of said wheels having a fixed horizontal axis of rotation with respect to said frame; driving means on said frame connected to said fixed axis wheel and linkage means for steering the others of said wheels about vertical axes of steering rotation through the center of each of said wheels to positions at which the horizontal axes of rotation of all wheels are parallel to each other, and to positions at which the horizontal axes of rotation of all wheels intersect at a common point at the center of said triangle, said dirigible wheels rotating in one direction when all of the wheels are in said parallel axis position and in the opposite direction when said wheels are in said intersecting axis position, and said fixed axis wheel rotating in the same direction in both said axis positions whereby said vehicle traverses straight line, arcuate and circular paths during operation.

2. The invention as recited in claim 1 wherein said steering means comprises a linkage assembly coupled to said steerable wheels for simultaneously steering the same in opposite directions only.

3. The invention as recited in claim 1 wherein said driving means includes foot pedals for operating by the vehicle rider.

4. The invention as recited in claim 1 wherein said linkage means comprises first and second steering means independently connected to a respective one of said dirigible wheels.

5. The invention as recited in claim 4 wherein each of said first and second steering means includes means biasing said dirigible wheels to a predetermined position.

6. The invention as recited in claim 1 further including a seat on said frame; and wherein said steering linkage means includes a steering wheel supported in front of said seat.

7. The invention as recited in claim 6 wherein said frame and said seat comprise a unitary member.

8. The invention as recited in claim 7 wherein said unitary member has a frustro-conical lower portion and an axially aligned cylindrical upper portion contiguously joined therewith, said seat being disposed substantially at the intersection of said portions.

* * * * *